United States Patent [19]

Lorch

[11] Patent Number: 4,617,965
[45] Date of Patent: Oct. 21, 1986

[54] CONTROL INSERT FOR SANITARY MIXER VALVES

[75] Inventor: Werner Lorch, Schramberg, Fed. Rep. of Germany

[73] Assignee: Hans Grohe GmbH & Co. KG, Fed. Rep. of Germany

[21] Appl. No.: 730,804

[22] Filed: May 6, 1985

[30] Foreign Application Priority Data

May 23, 1984 [DE] Fed. Rep. of Germany ....... 3419208

[51] Int. Cl.⁴ .......................................... F16K 11/078
[52] U.S. Cl. ............................. 137/625.17; 137/625.4
[58] Field of Search ............ 137/625.17, 625.4, 625.41

[56] References Cited

U.S. PATENT DOCUMENTS

| 2,503,881 | 4/1950 | Manis | 251/74 |
| 2,601,966 | 7/1952 | Busick | 251/52 |
| 3,384,119 | 5/1968 | Manoogian | 137/625.17 |
| 3,390,701 | 7/1968 | Moen | 137/625.41 |
| 3,435,849 | 4/1969 | Von Corpon | 137/625.4 |
| 3,704,728 | 12/1972 | Huneke | 137/625.4 |
| 3,965,936 | 6/1976 | Lyon | 137/625.17 |
| 4,088,153 | 5/1978 | Paasikivi | 137/625.17 |
| 4,243,063 | 1/1981 | Parkison | 137/625.41 |
| 4,378,029 | 3/1983 | Parkison | 137/625.4 |
| 4,513,781 | 4/1985 | Nikolayczik | 137/625.41 |

FOREIGN PATENT DOCUMENTS

| 2438855 | 2/1975 | Fed. Rep. of Germany . |
| 2756784 | 6/1978 | Fed. Rep. of Germany . |
| 2737478 | 2/1979 | Fed. Rep. of Germany . |
| 2904131 | 8/1980 | Fed. Rep. of Germany . |
| 3,219,574 | 12/1983 | Fed. Rep. of Germany . |
| 3325296 | 1/1984 | Fed. Rep. of Germany . |
| 2500564 | 2/1982 | France . |

Primary Examiner—Alan Cohan
Assistant Examiner—John A. Rivell
Attorney, Agent, or Firm—Steele, Gould & Fried

[57] ABSTRACT

A control disk insert for a one-lever mixer valve contains two preferably, planar disks, whereof one fixed disk has at least one opening zone for hot water and at least one opening zone for cold water. The control disk facing the fixed control disk and movable with two degrees of freedom can both completely close and continuously completely open the opening zones in the fixed control disk. The opening zones of the fixed control disk and the control edges of the movable control disks are constructed in such a way that the control disk insert has two completely separated, independently operating, but mechanically coupled controlsystems. Both control systems can be used for a common water outlet, or for two separate water outlets.

19 Claims, 11 Drawing Figures

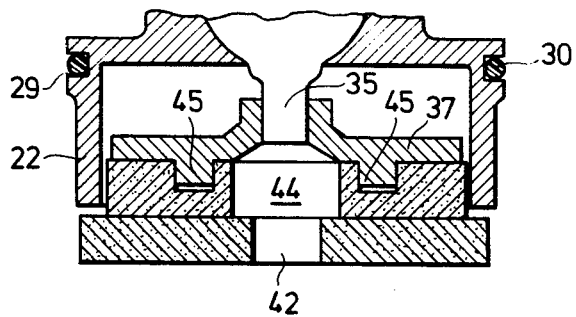
FIG. 2
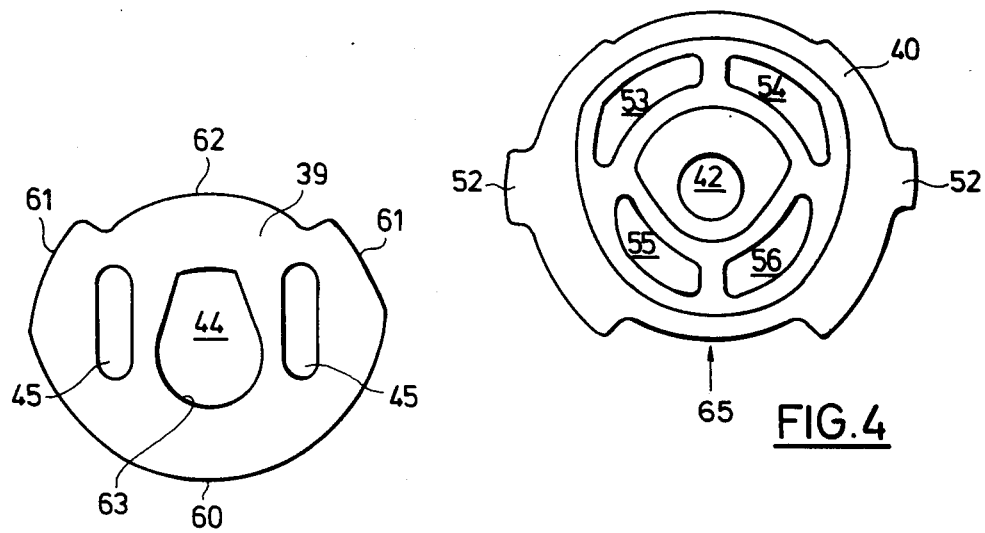
FIG. 5
FIG. 4
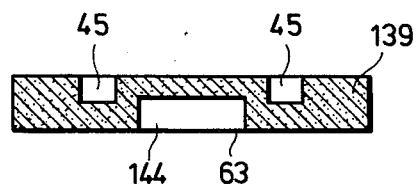
FIG. 6

CONTROL INSERT FOR SANITARY MIXER VALVES

BACKGROUND OF THE INVENTION

1. Field of the Invention

The invention relates to a control insert for sanitary mixer valves with a fixed, preferably planar control surface which can be connected to the water inlet ports of the valve having at least one opening zone for the cold water and at least one opening zone for the hot water, as well as a preferably planar control surface movable with respect thereto with two degrees of freedom. The control surface is moved with the aid of a mixer lever and for controlling the quanitity and mixing ratio as a function of its position it either covers the opening zones or makes a connection with at least one water outlet.

2. Prior Art

Such a mixer valve is already known from Offenlegungsschrift No. 2,756,784, dated June 29, 1978. In that dislosure, there is a fixed, planar disk having two water inlet ports, whereof one is intended for the hot water and the other for the cold water. Opposite said fixed disk, a further disk is displaceable and rotatable, the movable disk being able to completely cover or completely open the two inlet ports. By rotating the movable disk, it is possible to determine the mixing ratio and by displacing the movable disk it is possible to determine the total quantity of through-flowing water.

Another one-hand mixer valve of this type is known from Offenlegungsschrift No. 3,325,296, dated Jan. 19, 1984, and in this case the openings in a fixed control surface are closed by the outer edges of a movable control disk. The inlet port both for the hot water and for the cold water can comprise two juxtaposed openings.

The known mixer valves either have an inner edge control system or an outer edge control system.

Inner edge control systems suffer from the disadvantage of requiring a relatively large amount of space. The displaceable control disk must be sufficiently large that on either side of the control opening there is the corresponding dimensions of the particular opening and a corresponding sealing area. In addition, the control opening must at least be as large in one direction as the openings and the spacing thereof. Thus, in the case of a given size of the mixer valve, the flow cross-section of the control mechanism can be relatively small, which leads to increased flow rates and consequently disturbing noise.

The known control systems of the aforementioned type suffer from the further disadvantage that their possible uses are limited. They are difficult to adapt for the various uses.

SUMMARY OF THE INVENTION

The problem of the invention is to provide a control insert for a single lever mixer valve, whose possible uses are more extensive than has hitherto been possible.

According to the invention, this problem is solved in that the opening zones and/or the contours of the movable control surface and/or the water outlet are arranged and constructed in such a way that two separate, independent, mechanically coupled control systems are obtained. These two independently operating control systems make it possible to increase the number of possible uses of the control insert. Thus, for example, it is possible to allow the two control systems to operate in parallel for increasing the flow or passage cross-section, which increases the latter more than in the case where the individual opening zones of a single control system are enlarged. However, it is also possible to use the two control systems for different purposes. Thus, for example, one control system can be used for an overhead shower and the second control system for a lateral shower. In this case, the two control systems can act on in each case one water outlet, which is separate from the other water outlet. This leads to the advantage that the two showers are not interconnected downstream of the mixer valve, so that on turning off the water, the water from the overhead shower cannot flow out through the pipe via the lateral shower. In addition, the separate control systems for the two showers make it possible to give them different mixing characteristics. Thus, for example, an overhead shower can have a different maximum temperature or a different maximum mixing ratio as compared with the lateral shower.

According to another feature of the invention, the two control systems can act on a common water outlet. This is not only appropriate for increasing the cross-section, but is also advantageous in special cases, e.g. in the case of British Standard requirements. It must be ensured in connection with these valves that the hot water flow and the cold water flow are only mixed at the outflow end of the mixer. According to the invention, this can e.g. be achieved in that the hot water is controlled by means of one control system and the cold water by means of the second control system and that a common water outlet located at the mixer outlet is supplied by both control systems.

According to a further development of the invention, the movable control surface has an outer control edge for bringing about one control system and an inner closed control edge for bringing about the second control system. In other words, the control insert according to the invention has an outer and an inner edge control system.

The fixed control surface can also have in each case two opening zones for each control system, so that each control system can perform a temperature control. However, it is also possible, for example, for two opening zones for one of the two control systems to have only hot water or only cold water. This possibility can be utilized for bringing about a favourable control characteristic with continuous flow heaters which is particularly difficult because the main pressure drop is produced in the continuous flow heater and the downstream valve should have a minimum resistance on the hot water side. It is also conceivable to use one of the two control systems for cold water only, e.g. to bring about a temperature limitation in the case of a high initial temperature.

The invention also proposes that in each case two opening zones diametrically face one another.

According to a further development, the fixed control surface can be connected to a water inlet, in which case the water outflow can take place through the same control surface as that through which the water inflow takes place, but deflected by 180°.

The invention also proposes that the control surfaces are limiting surfaces of preferably planar control disks. These e.g. ceramic control disks are particularly suitable for defining the control surfaces. If the disks and control surfaces are flat, one degree of freedom can be a rotation and the other a displacement of the control disks.

The invention also proposes that one control edge is part of an opening passing through the associated control disk. Thus, in this case, there is a water passage from one side of the control disk to the other, so that the water issues into an area within the control insert, into which also issues the water passing out of the outer edge control system.

However, it is also possible and as is further proposed by the invention, for a control edge to limit a recess issuing into the control surface and which is closed towards the other side of the control disk. This permits a particularly simple separation of the water outlets from the two control systems, so that both control systems can act on different water outlets.

According to another feature of the invention, the two control systems can have at least partly identical control characteristics, so that the two control systems simultaneously open the water inlet ports. It is also possible for the two control systems to simultaneously open, but with the change to the mixing ratio ending earlier with one control system than with the other. It is also possible for the two control systems to successively open, the opening processes having a time overlap.

The invention proposes that the facing opening zones extend over roughly the same angle.

According to the invention, it can be provided that the facing opening zones have differing cross-sections. However, it is also possible for them to have the same cross-section.

The invention further proposes that two adjacent openings zones perferably having the same cross-section with a control edge form a control system.

BRIEF DESCRIPTION OF THE DRAWINGS

The invention is described in greater detail hereinafter relative to non-limitative embodiments and the attached drawings, wherein:

FIG. 2 is diagrammatically, a partial section through the arrangement according to FIG. 1 from a direction turned by 90°.

FIG. 4 is a plan view of the fixed control disk of the arrangement according to FIG. 1.

FIG. 5 is a plan view of a first embodiment of a movable control disk.

FIG. 6 ia a longitudinal section through a movable control disk of a second embodiment.

DETAILED DESCRIPTION OF THE PREFERRED EMBODIMENTS

Figure 1:
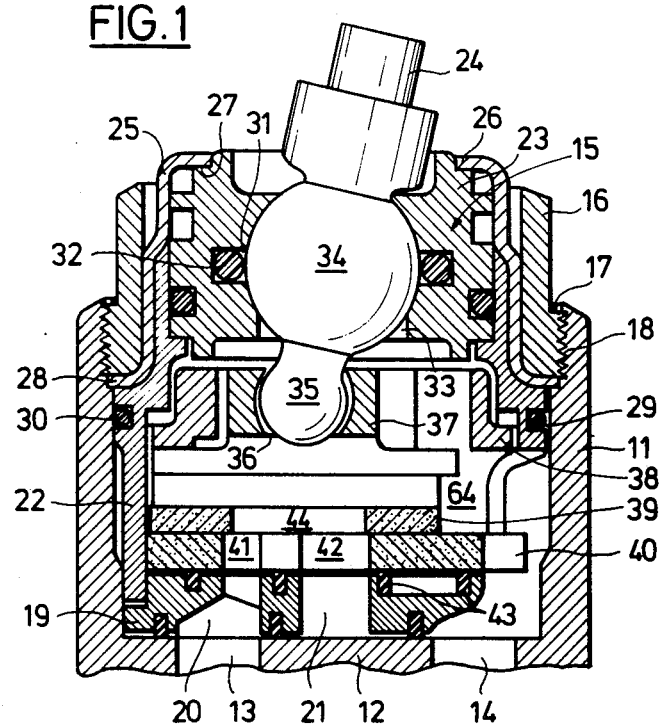
FIG. 1 is a cross-section through part of a mixer valve with a control insert according to the invention.

FIG. 1 shows the housing 11 of a mixer valve in broken away manner. The housing 11 contains a housing base 12, which is provided with a plurality of water inlets 13 whereof only one can be seen in FIG. 1, as well as with a water outlet 14. A control insert 15 is inserted in housing 11 and is secured from the outside by a collet 16. By means of an external thread 17 arranged on its outside, collet 16 engages in a corresponding internal thread 18 in the central bore of housing 11.

Insert 15, which is also called a cartridge, has a cartridge base 19 with a plurality of holes 20, 21. The cartridge also contains a first sleeve 22, in which is inserted from above a mounting part 23 for an operating member 24. From the top, a cap 25 is placed over the mounting part 23 and its inner edge 26 rests on a shoulder 27 on the top of mounting part 23. On its lower side in FIG. 1, cap 25 has an outwardly directed flange 28, on which engages the bottom of collet 16. Thus, collet 16 moves downwards both the mounting part 23 and, by means of its flange 28, the cartridge sleeve 22, so that the control insert 15 is secured in the interior of housing 11. For sealing purposes, sleeve 22 has a ring packing 30 arranged in an all-round annular groove 29. Mounting part 23 is also sealed with respect to the inside of sleeve 22 with the aid of a ring packing 32 arranged in an annular groove 31.

Mounting part 23 has an axial opening 33 which is enlarged on the outside and inside, which at least partly has the shape of a ball. The central, roughly spherical portion 34 of operating member 24 is arranged in this spherical part of opening 33. Below the spherical portion 34, the operating member 24 continues in an attachment 35, whose cross-section is approximately circular in FIG. 5, whereas the cross-section of attachment 35 is rectangular from a direction at right angles thereto, cf FIG. 2. This attachment 35 is placed in a correspondingly shaped clearance 36 of a motion transmission element 37, which is displaceably and rotatably mounted in a ring 38 arranged within the sleeve 22. A pivoting of operating member 24 about an axis at right angles to the plane of FIG. 1 leads to a displacement of the motion transmission element 37, whilst a rotation of operating member 24 about its own longitudinal axis leads to a rotation of the motion transmission element 37. The latter is coupled to a ceramic control disk 39. The lower limiting surface of control disk 39 in FIG. 1 forms a first control surface.

Below the movable control disk 39 is located a fixed control disk 40 secured in the control insert and whose upper limiting surface forms the second control surface. The only diagrammatically represented fixed control disk 40 rests on the cartridge base 19. The upper outlet of holes 20, 21 of cartridge base 19 coincide with the openings 41, 42 in control disk 40. On both the top of cartridge base 19 and on the bottom, seals 43 are arranged around the openings of holes 20, 21. The movable control disk 39 also has a through-opening 44, whose shape will be explained in detail hereinafter.

FIG. 2 shows a partial section through the arrangement according to FIG. 1 from a direction at right angles thereto. It can be seen that the attachment 35 of operating member 24 has a rectangular cross-section from this direction and engages in flush manner in a correspondinglly constructed clearance 36 of the motion transmission element 37. The latter is provided on its underside with two elongated ribs 45, which engage in correspondingly shaped grooves 46 on the top of the movable control disk 39. This permits a rotation of the movable control disk 39 relative to the fixed control disk 40.

Figure 3:
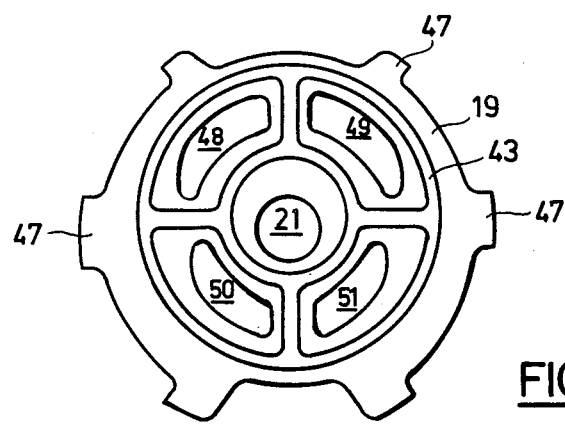
FIG. 3 is a plan view of the base plate of the control insert of the arrangement according to FIG. 1.

FIG. 3 is a plan view of the cartridge base 19, which is roughly in the form of a circular disk with the protuberances 47 on its outside for engaging in corresponding grooves within the mixer housing 11, the protuberances 47 having different widths, so that an inverted insertion of the cartridge base is prevented.

Cartridge base 19 has a central and in particular circular hole 21, cf also FIG. 1. Around the central hole 21, there are openings 48 to 51, which form the upper outlets of the holes 20 in FIG. 1. Between the openings 48 to 51 and outside the same is inserted the packing 43 shown in FIG. 1. Opening 48 is located in a quadrant of the roughly circular cartridge bottom 19, whilst the opening 51 is located in the facing quadrant. This also applies to openings 49, 50, which also diametrically face one another. Hole 21 is slightly eccentrically displaced with respect to openings 48 and 51, all the openings being positioned in a roughly arc-like manner.

The shape of openings 48 to 51 roughly corresponds to the shape of the openings 41 of the fixed control disk 40, which will be explained relative to FIG. 4. Thus, with the aid of the cartridge bottom 19, a connection is formed between the openings or opening zones of the fixed control disk 40 and the housing base 12 of the mixer valve. As can be seen in FIG. 1, it is also possible that no opening in the housing base 12 of the mixer valve corresponds to the hole 21 in the carriage bottom, so that the action of hole 21 is stopped, without it being necessary to use a different cartridge bottom 19. It is also possible for special purposes to use the cartridge bottom 19 shown in FIG. 3 in conjunction with a mixer housing 11, which e.g. opening 48 has no corresponding water inlet. This makes it possible to obtain different mixing ratios although the same control insert is used throughout.

FIG. 4 is a view of the fixed control disk 40, which once again has a circular shape and two centering protuberances 52. The fixed control disk 40 has four openings 53 to 56, whose shape and arrangement correspond to the openings 48, 51 of the cartridge bottom 19. Opening 53 diametrically faces opening 56, whilst opening 54 diametrically faces opening 55. Control disk 40 also has a central circular opening 42, cf also FIG. 1. Opening 42 is positioned slightly eccentrically. Openings 53 to 56 all extend roughly over the same angle, whilst the surfaces of openings 53 and 56 are of different sizes. On drawing a line separating from one another the adjacent openings 53, 54 and the adjacent openings 55, 56, then in each case openings 53, 54 and 55, 56 are homologous to one another. Any of openings 48-51 and 53-56 could also be made up of smaller openings.

FIG. 5 shows a plan view of the movable control disk 39 used in the embodiment according to FIGS. 1 and 2. It contains a central opening 44 and laterally with respect thereto, the two grooves 45 indicated in FIG. 2.

The lower half of the control disk 39 in FIG. 5 is bounded by an edge 60, which runs along an arc. The upper half of the control disk 39 in FIG. 5 is bounded by on edge 61, which in its outer portions have the same radius, but a different centre to the edge 60 of the lower half. Roughly in the centre of the upper half, edge 61 is replaced over an angle of approximately 90° by a setback edge 62 located on an arc. Edge 62 forms an outer edge control system in conjunction wih the openings 53, 54 in FIG. 4 and as will be shown hereinafter.

The lateral edge 63 of opening 44 in control disk 39 forms an inner edge control system with the two other openings 55, 56.

The operation of the apparatus is as follows. Water flows via water inlet 13, of FIG. 1, through the hole 20 in cartridge bottom 19 to openings 53 to 56 in the fixed control disk 40. As a function of the position of the movable control disk 39, the openings are closed to a greater or lesser extent. If the openings are at least partly open, the water flows out of the openings through the central opening 44 of the movable disk or past the edge 62 of the movable disk 39 into the space 64 above said disk and from there outwards in the direction of the side wall of the housing 11, from where the water passes axially downwards along the housing edge and out through the water outlet part 14 of the housing base 12. To enable the water to flow out more easily on the side of the housing 11, both cartridge bottom 19 and the fixed control disk 40 has a recess 65 at this point, cf FIGS. 3 and 4.

However, the control insert according to FIG. 1 leads to a different flow in a different mixer housing. The cartridge bottom 19 has a central hole 21 aligned with the central opening 42 of the fixed control disk 40 and which could also be used in a mixer housing, in which there is a central water outlet in an extension of hole 21. Water can then flow out of the housing through said central outlet. In this case, it is possible to use the movable control disk 139, shown in sectional form in FIG. 6 which, unlike the control disk according to FIG. 5, has no central through-opening 44 and instead only has a clearance 144 which is open at the bottom. The shape of this clearance 144 otherwise completely corresponds to the shape of opening 44 of control disk 39 according to FIG. 5, so that the lateral edge 63 is also identical. Thus, it permits the same control characteristics, the outflow only taking place downwards through the central opening 42 of control disk 40.

The control disk according to FIG. 6 can be used for numerous purposes. It is firstly possible to carry out only one control, e.g. of the hot water via recess 144 and the central opening 42 of the fixed control disk, whilst the control water control takes place via outer edge 62. Both water flows can then be combined at the mixer outlet. This mixing at the mixer outlet is prescribed by the British Standard.

It is also possible to e.g. control a lateral shower by means of recess 144 and a central outlet, whilst the overhead shower is controlled by means of control edge 62 and the lateral outlet 14. The two control systems are mechanically interconnected, there being no connection between the pipes to the individual showers downstream of the mixer. Thus, there can also be no return flow of water from the overhead shower to the lateral shower.

It is also possible to only use the inner edge control system for mixers with a limited rate of flow, e.g. wash stand or bidet mixers.

Figure 7:
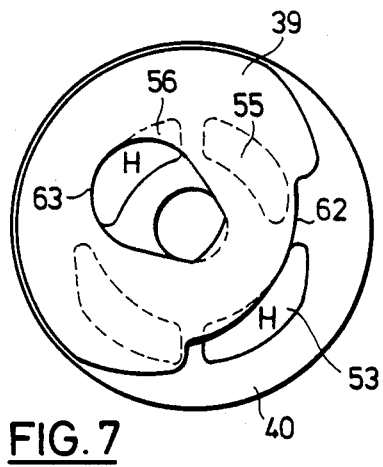
FIGS. 7 to 11 are diagrammatically positions of fixed and movable control disks.
Figure 8:
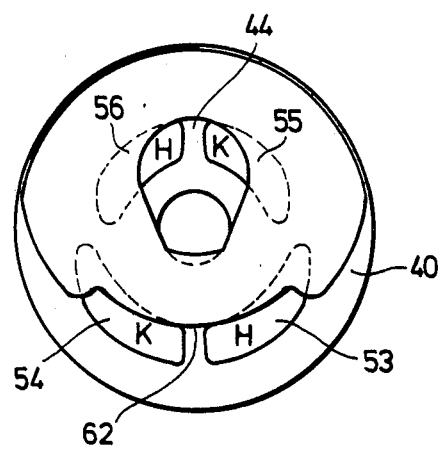

With reference to FIGS. 7 to 11, the interactions of the two control disks for mixing the two water flows and for setting the water quantity will now be described. A rotation of the movable control disk 39 or 139 leads to a temperature change, whilst a displacement of the movable control disk in the longitudinal direction of the elongated central opening 44 permits the choice of the water quantity. In FIG. 7, the control disk is rotated counterclockwise to its end position and is simultaneously displaced to the left and upwards. The edge 63 of opening 44 completely frees the opening 56 of the fixed control disk 40, which is to be connected with the hot water. Simultaneously, the control edge 62 of the outside of control disk 39 completely frees opening 53, which is also connected to the hot water inlet. This position consequently means maximum opening at maximum temperature. If the control disk 39 is now rotated clockwise, then the situation is as shown in FIG. 8. Opening 44 frees to an equal extent the openings 55, 56 in the fixed control disk, whereas the edge 62 also to a roughly identical extent frees the openings 53, 54.

Thus, FIG. 8 shows the control insert position with a 50% mixing ratio.

Figure 9:
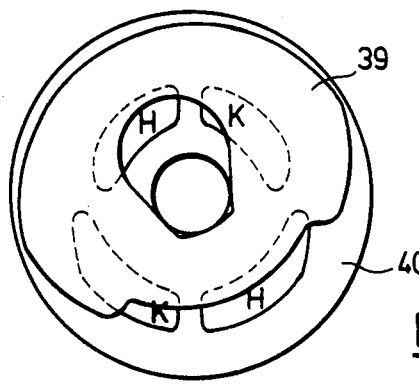

FIG. 9 shows the movable control disk 39 rotated to some extent counterclockwise with respect to the position in FIG. 8 and is simultaneously displaced somewhat to the right, so that a somewhat warmer temperature with a somewhat lower flow rate is set.

Figure 10:
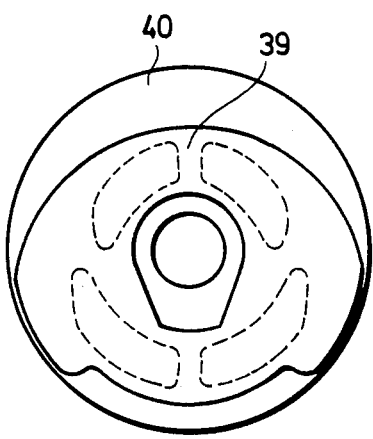
Figure 11:
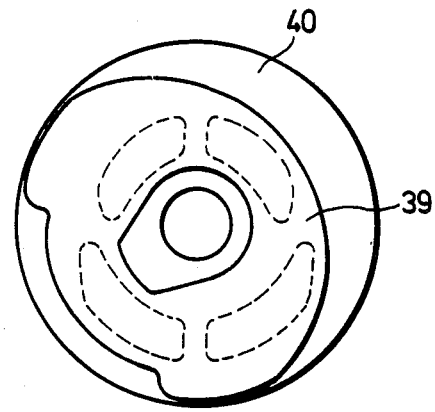

If the movable control disk 39 is moved downwards from the position in FIG. 8 without turning it, the position shown in FIG. 10 is obtained, in which the valve is closed in the central temperature position. In this closed position, control disk 39 can be rotated both clockwise and counterclockwise without the valve opening.

As can be gathered from FIGS. 7 to 11, facing opening 53 to 56 in the fixed control disk 40 are in each case connected to the same water inlet. It can be appropriate for special purposes to e.g. connect both openings 53, 54 to the same water inlet, e.g. for cold water, if a temperature limitation is desired. In the case of continuous flow heaters, it could be appropriate to link both openings 53, 54 to hot water for reducing the pressure drop.

Whereas in the case of the represented embodiment the openings 55, 56 used for the internal control system are mirror symmetrical, which also applies to the openings 53, 54 for the outer control system, it would also be possible for the openings not to be arranged in mirror symmetrical manner for obtaining a specific temperature characteristic. The measure according to the invention leads to a number of advantages. The space available for the control openings is utilized in an optimum manner. Thus, compared with conventional control systems with an identical construction of the cartridge, much higher water quantities can be passed through. However, for an only limited increase in the water quantity, the flow rates can be kept lower and as a result the noise produced can be reduced. In the case of valves which are only intended to control smaller water quantities, it is possible to use the same cartridge and in this case only one control system is connected. In practice, this is possible with difficulty. It is merely necessary to insert the control insert in a correspondingly drilled mixer housing. The packings remain the same. The inner or outer control system can then be used, as a function of the individual case.

Through the provision of a central hole in the fixed control disk, the cartridge can be used as a closed system, if the movable control disk is either closed at the top, e.g. through the motion transmission part, or only has a downwardly open extension. The mixing water outflow then passes downwards parallel to the inflow. By omitting the cover or by replacing the movable control disk, it is also possible to use the inner edge control system as an open system.

Both the inner and the outer edge control systems can be provided with a special mixing geometry as a result of corresponding shaping. Thus, as a function of the intended use, the inner edge control system, the outer edge control system or both can be used simultaneously.

As a result of the crosswise control of the inner and outer control systems, e.g. inner system for hot water only and outer system for cold water only, the British Standard requirements can be fulfilled in the case of the closed version of the inner control system. Hitherto, it has only been possible to fulfil this special requirement by using special valves or fittings. The cartridge can be used in the base of mixers for pressureless boilers, where similar conditions to those defined in the British Standard apply.

A further advantage can be obtained in connection with continuous flow heaters, where the special feature is that the maximum pressure drop occurs in the actual heater and then the series-connected valve should have a minimum flow resistance, at least on the hot water side. Here again, it is appropriate to use the outer edge control system with the largest cross-section for the hot water side and the inner edge control system for the cold water side. As a result of the roughly inversely proportional association with the pressures in the supply pipe, a balanced control behaviour is once again obtained.

All these possible variations are obtained with a constant control disk merely by different connections and optionally by covering the internal control system to form a closed system in conjunction with the central drain hole. The ceramic disks and the remaining cartridge structure can remain the same. The adaptation of the connections can take place by means of corresponding bores in the housing directly below the cartridge.

What is claimed is:

1. A control insert for a sanitary mixer valve having means for connection to hot water and cold water supplies and having at least one outlet, the control insert comprising:
   a fixed control surface which can be connected to water inlet ports of the valve, the fixed control surface having openings defining at least one opening zone for cold water and at least one opening zone for hot water from the supplies;
   a movable control surface cooperating with the fixed control surface with two degrees of freedom, and a mixer lever connected to the movable control surface for controlling quantity and mixing ratio as a function of relative position of the fixed and movable control surfaces, movement of the control surfaces controlling alignment of openings in the movable control surface with at least one of the opening zones and the at least one water outlet, wherein at least two separable mechanically coupled mixing flow paths are defined, the flow paths each having controllable connection to the hot water and cold water supplies.

2. A control insert according to claim 1, wherein the two mixing flow paths lead to a common water outlet.

3. A control insert according to claim 1, wherein each of the mixing flow paths leads to a single water outlet, which water outlet is separate from a water outlet of an other mixing flow path.

4. A control insert according to claim 1, wherein the movable control surface has an outer open control edge movable across the inlet ports for controllably mixing water along one of the mixing flow paths and an inner closed control edge mechnically coupled to the outer control edge and movable across the inlet ports for controlling the second mixing flow path.

5. A control insert according to claim 1, wherein the fixed control surface has in each case two opening zones for each control system.

6. A control insert according to claim 1, wherein two opening zones for each of the mixing flow paths diametrically face one another.

7. A control insert according to claim 1, wherein the fixed control surface also has openings defining a path to a water outlet.

8. A control insert according to claim 1, wherein the fixed and movable control surfaces are surfaces of planar controlled disks.

9. A control insert according to cliam 1, wherein a control edge at least partly defines an opening passing through an associated disk.

10. A control insert according to claim 1, wherein a control edge bounds a clearance issuing into the control surface and closed towards the other side of the control disk.

11. A control insert according to claim 1, wherein both mixing flow paths have at least partly corresponding control characteristics.

12. A control insert according to claim 1, wherein facing opening zones extend over roughly equal angles.

13. A control insert according to claim 1, wherein facing opening zones have cross-sections of different areas.

14. A control insert according to claim 1, wherein the mixing flow paths are each defined by two adjacent alignable opening zones having equal cross-sections, a control edge of one of the opening zones being movable across the other alignable opening zone to define a the mixing flow path.

15. A control insert according to claim 1, wherein the mixing flow paths have different control characteristics.

16. A control insert according to claim 1, wherein the control surfaces are spherical surfaces.

17. A control insert according to claim 1, wherein an opening zone is defined by a plurality of openings.

18. A control insert according to claim 1, wherein the controlled flow paths are mechanically coupled to bring about simultaneously variable control processes.

19. A sanitary mixer valve with a fixed control surface connectable to water inlet ports of the valve, the fixed control surface having at least one opening zone for cold water and at least one opening zone for hot water, a control surface movable with respect to said fixed control surface with two degrees of freedom, a mixer lever attached to the movable control surface for controlling quantity and mixing ratio between the opening zones and at least one out port as a function of position, and wherein:

the fixed and movable control surfaces define at least two separable mechanically coupled controlled mixing flow paths.

* * * * *